J. B. Johnson,
Lasting Machine.

No. 3602. Reissued Aug. 17, 1869.

Witnesses
L. A. Brooks
Geo. S. Ayres

Inventor
Joseph B. Johnson
by his attorney
R. H. Eddy

United States Patent Office.

CHARLES BUFFUM, OF LYNN, MASSACHUSETTS, ASSIGNEE OF JOSEPH B. JOHNSON.

*Letters Patent No.* 46,299, *dated February* 7, 1865; *reissue No.* 3,602, *dated August* 17, 1869.

CASE A.

IMPROVEMENT IN SHOES.

The Schedule referred to in these Letters Patent and making part of the same.

*To all persons to whom these presents may come:*

Whereas Letters Patent, No. 46,299, of the United States of America, were granted, on the 7th day of February, A. D. 1865, to the undersigned and JOSEPH B. JOHNSON, as the assignees of the said JOHNSON in the matter of an invention having reference to the Manufacture of Shoes; and whereas the said JOHNSON has since assigned and conveyed to the undersigned all his (the said JOHNSON's) right, title, and interest in the said invention and Letters Patent, so that the undersigned is the sole owner thereof, and of all the invention as made by such JOHNSON; and whereas, by reason of insufficient claims or description, the said Letters Patent are believed not to be fully available to the undersigned, and he has asked leave to surrender the same for reissue:

Now, therefore, I, the undersigned, CHARLES BUFFUM, of Lynn, of the county of Essex, and State of Massachusetts, in accordance with law in such cases provided, do hereby declare the said invention to be fully described in the following specification, and represented in the accompanying drawings, of which—

Figure 1 denotes a transverse section of a shoe-upper lasted, and having an outer sole applied to it, in accordance with the said invention.

Figure 2:
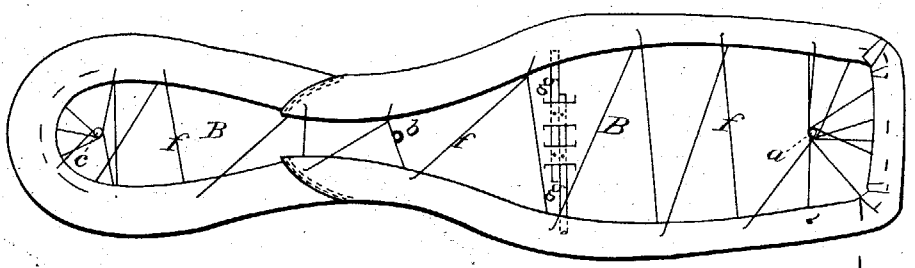
Figure 2 is an under-side or bottom view of the shoe-upper as "lasted."
Figure 1:
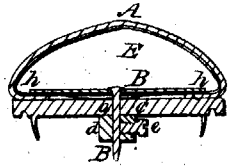
Figure 3:
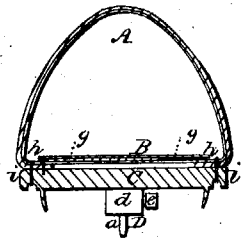
Figure 3 is a transverse section of the said lasted upper, such section being taken through the "spurs," hereinafter described, for the purpose of maintaining the outer sole and the upper in their due relations where the spurs pass into them, and after the last may have been removed from the upper, preparatory to the carrying on of the process of sewing together the outer sole and the upper.

The said invention is particularly useful for applying a single sole to a shoe-upper, that is, the "upper leather" of a shoe.

Prior to the said invention, the connection of the outer sole to the upper by means of sewing, performed by a sewing-machine, such as has been patented by Lyman R. Blake, and wherein the shoe, while being so sewed, is supported by a "horn," or arm projecting within it, has required the upper to be sewed or tacked to the insole in the process of lasting the two, and also that the sewing for the connection of the outer sole and the upper should not only be carried through them, but go through the inner sole.

With the invention of said JOHNSON, as no permanent inner sole is employed, there is no sewing or tacking of such inner sole to the upper, in the process of lasting the upper on the false inner sole, neither is there any sewing together of a permanent inner sole to the outer sole and the upper, the outer sole and upper being the parts only through which the sewing-machine lays its stitches.

The mode of making the shoe, involving, as it does, the employment of what is herein termed a "false inner sole," which is usually made of sheet-metal, renders this sole disconnected with the outer sole by sewing going through the two.

The said false inner sole becomes a simple supporter of some if not all of the centring-devices of the outer sole, and also of the portions of the upper, which are lapped on it. It also serves as a supporter of the outer sole and the upper during the process of sewing them together, the sewing by which the upper and outer sole are united, being so arranged as to go around and outside of the periphery of the said supporter or false inner sole.

The employment of the said supporter or false inner sole is to be attended with the removal of it from the shoe, after the outer sole and the upper may have been sewed together, a piece of leather, cloth, or other proper substitute, being subsequently pasted on the inner surface of the outer sole, and so as to cover the lacings of the laps of the upper, when left in the shoe, as well as the sewing by which the outer sole and the upper may be connected.

From the description herein given, it will be seen that the shoe as made, and the mode of making it, were novel at the period of the invention thereof by the said JOHNSON, the shoe, or the improved manufacture, consisting of the outer sole and the upper, with the connecting sewing, and with the lacings or thread-connections of the lips of the upper, or those parts of it resting against the outer sole.

It will further be seen that for the proper centring or arrangement of the outer sole on the false inner sole, and the temporary fixation of the two together, certain centring as well as certain connecting-devices become essential, the latter being of a character to enable the detaching of the false inner sole from the outer sole to be easily or readily effected after the outer sole and the upper may have been sewed together.

In the drawings—

A denotes the upper;

B, the false inner sole or supporter of the outer sole and upper, it being in common practice a metallic plate;

C is the outer sole; and

E, the shoe-last.

From and through the metallic plate, or false inner sole B, three, or any other suitable number of centring-pins or studs, *a b c* project. One of them, viz, that marked *a*, is arranged at or about at the centre of the toe, while another, *c*, is disposed at or near the centre of the heel-part of the said plate B, the same being as represented in the drawings.

The remaining pin or pins should be placed between the pins *a* and *c*.

To each pin there is a clamp or sole-holder, D, which, as represented, consists of a cylindrical annulus or collar, *d*, (to slide and fit on the pin,) and a clamp-screw, *e*, the said screw being screwed radially into the collar, or so as to be capable of being screwed against the pin, for the purpose of confining the annulus thereto.

Instead of the clamp being so made, it may be a screw-nut, to screw directly upon the pin; such pin, under such circumstances, having a male screw cut or formed in it to receive the nut.

Besides the above there may be affixed to the outer surface of the false inner sole, two "spurs" *g g*, each consisting of a strip of "spring-steel," fastened at or near one end of it to the said sole, and near the free end being bent at a right angle to the rest of the spur, and sharpened, the whole being so as to render the part so bent up capable of passing through and hooking to the overlap of the upper, and of projecting beyond it, and into the main sole a short distance.

These spurs on the false inner sole are arranged thereon in the positions as represented in the drawings; such being the places where, if anywhere, there is danger of displacement of the upper with respect to the sole, on removal of the shoe-last from the upper.

In lasting the upper, the last being within it, and the false inner sole being arranged on the said last, strong thread is to be sewed into those edges or parts of the upper which overlap the false sole. The thread is also to be carried across the false inner sole, from one lap to its opposite, in manner as shown at *f* in fig. 2; the heel and the toe-parts of the laps of the upper being stayed, and drawn into place, by carrying or winding the thread more or less around the pins *a c*, and from them to the laps, and from the laps to them, as shown in the drawings.

The false inner sole is not so large as the sole or bottom surface of the shoe-last, their peripheries or edges being parallel, or about so, so as to leave a narrow space, *h*, extending entirely around the false inner sole, and between it and the edge of the sole or bottom surface of the last.

After the upper may have been lasted as above described, the sole C is to be put in place, holes being previously made in it for reception of the several pins *a b c*, which, with the said holes, become means of centring the sole, or readily defining its correct position on the upper.

Next, the clamps should be put on the pins, and the screws of the clamps should be turned up, so as to fasten the clamps to the pins, care being also taken to have the pointed or hooked ends or parts of spurs pressed into and through the overlaps of the upper, and into the outer sole.

All this having been accomplished, the last may be withdrawn from the shoe, which will then be ready for being applied to the sewing-machine, for the purpose of having the sole C sewed directly to the overlaps of the upper by sewing going through the said overlaps and sole, and in the space *h* around the outer edge of the false inner sole, the same being as shown at *i*.

The sole C may be chambered for the reception of the sewing.

After the sole and upper may have thus been sewed together, the clamps should be removed from the pins, which, with the false inner sole, should be withdrawn from the shoe; a cover being subsequently cemented to the inner face of the sole and on the sewing, as well as on the lacings or lacing-connection extending across the said face.

The advantages of the said JOHNSON's mode of making a shoe are that it enables the manufacturer to dispense with the usual permanent inner sole, and a considerable portion of the upper required in the overlaps, when such an inner sole is employed with and sewed or fastened to the overlaps. In this way the invention economizes material. It also effects a saving in labor as well as a saving in the expense and use of lasting-tacks. It enables the manufacturers to produce a "machine-made shoe" capable of successfully competing, as to cost and quality, with the usual hand-sewed shoes, especially in respect to the lighter varieties thereof.

What is claimed by the undersigned as the invention of the said JOHNSON, may be stated as follows, viz:

The above-explained improvement in lasting a shoe, the same consisting in the employment of a "false inner sole," B, in connection with the last E and upper A, and drawing the upper on the said last and sole, by means of thread *a*, sewing *f*, or the equivalent thereof, extended across the false sole, but without going into or through it, so as to prevent it from being easily detached from such thread, so as to be removed from the shoe after the outer sole may have been sewed to the upper.

Also, the combination of centring-devices with the false inner sole and the upper, or with such and the outer sole; such centring-devices, as represented, being the pins *a b c*, and for the purpose of effecting, by means of the holes in the outer sole, the ready centring or proper arrangement of the outer with the "false inner sole" and the overlaps of the upper.

Also, the combination of the false inner sole, and its centring-pins or devices, with mechanism for clamping or holding the outer sole in place on the false inner sole after being centred or properly adjusted thereon, such clamping-devices as described and represented, consisting of the annuli *d*, and their screws *e*.

Also, the combination of the spurs *g g*, or their equivalents, with the "false sole" B and the upper A, when lasted as specified; such spurs being for the purpose of maintaining the said outer sole and the upper in their proper relation at or near the ball of the foot.

Also, the combination of one or more pins *a c*, or their equivalents, with the false sole B and the sewing *f*, extended across such sole, and about the said pin or pins, substantially in manner as hereinbefore explained.

Also, the improved manufacture or shoe, substantially as described, viz, as made with the outer sole and the upper sewed together, and the overlaps of the upper connected by a lacing, or its equivalent, crossing from one to the other of them, and applied in lasting the upper, by the use of a false inner sole or support-plate as specified.

Also, in constructing a boot or shoe, as connecting the side overlaps of its upper by a lacing, extended transversely across the shoe from one of them to its opposite, and holding in place the heel and toe-overlaps by such lacing extended through them.

Also, in combination with the upper and the lasting-plate applied to the last, as described, a lasting-thread, carried across such lasting-plate, and passing through the laps of the upper.

Witnesses: CHARLES BUFFUM.

R. H. EDDY,

J. R. SNOW.